United States Patent [19]
Fuller

[11] Patent Number: 5,694,571
[45] Date of Patent: Dec. 2, 1997

[54] UTILIZING A ROTATING RANDOMLY ACCESSIBLE MASS STORAGE MEDIUM AS A CACHING DEVICE FOR ANOTHER ROTATING MASS STORAGE MEDIUM

[75] Inventor: Billy J. Fuller, Colorado Springs, Colo.

[73] Assignee: Sun Microsystems, Inc., Mountain View, Calif.

[21] Appl. No.: 551,116

[22] Filed: Oct. 31, 1995

[51] Int. Cl.⁶ .................................................. G06F 12/00
[52] U.S. Cl. ........................ 395/440; 395/469; 395/470; 395/464
[58] Field of Search ..................... 395/440, 469, 395/470, 464

[56] References Cited

U.S. PATENT DOCUMENTS 5,313,612   5/1994   Satoh et al. .......................... 395/440
5,584,007  12/1996   Ballard ................................. 395/440

Primary Examiner—Eddie P. Chan
Assistant Examiner—Reginald G. Bragdon
Attorney, Agent, or Firm—William J. Kubida; Stuart T. Langley; Holland & Hart LLP

[57] ABSTRACT

A computer memory system and method utilizes a disk drive as a caching device to overcome the size and cost limitations of conventional semiconductor cache memory. Despite providing somewhat slower access times than semiconductor cache memory, utilizing one or more disk drives as a caching device allows enhanced performance to be maintained for longer times under sustained loads by effectively decreasing the latency of the primary storage device, combining relatively small random requests into larger sequential requests, balancing the input/output ("I/O") load over several disk devices and/or canceling duplicate writes.

25 Claims, 5 Drawing Sheets

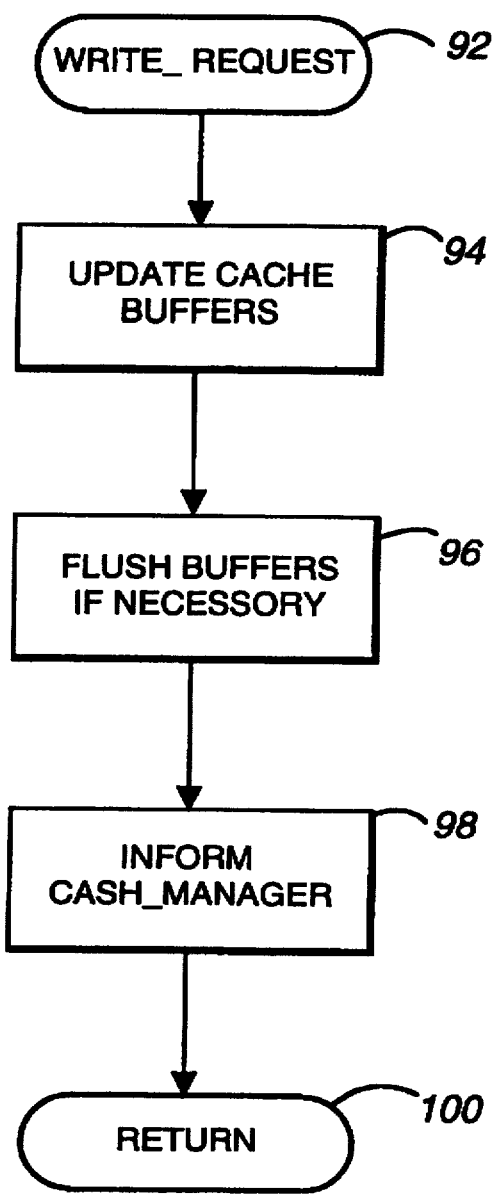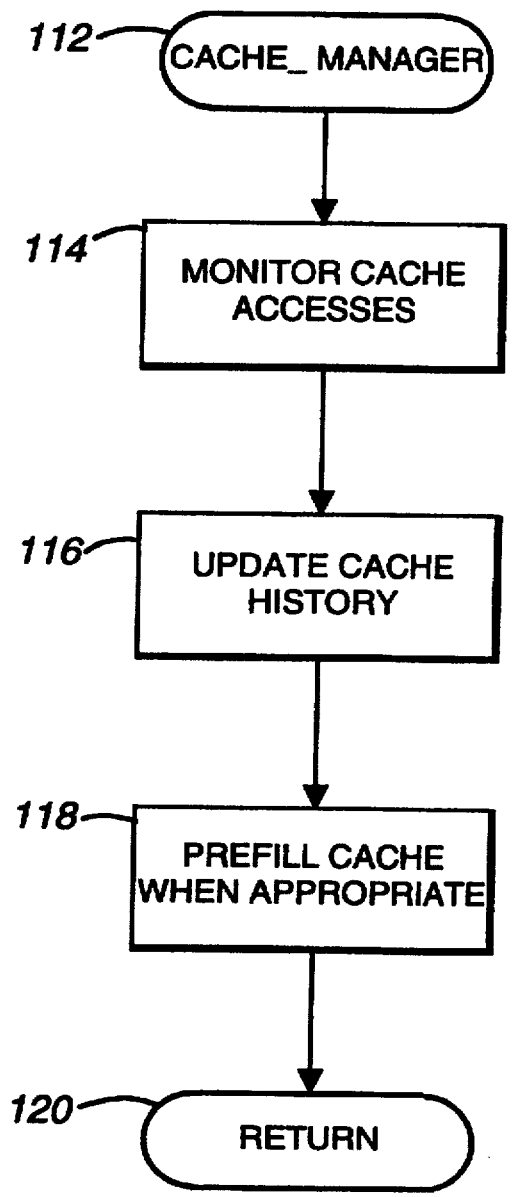
Fig. 7
Fig. 8

UTILIZING A ROTATING RANDOMLY ACCESSIBLE MASS STORAGE MEDIUM AS A CACHING DEVICE FOR ANOTHER ROTATING MASS STORAGE MEDIUM

BACKGROUND OF THE INVENTION

The present invention relates, in general, to the field of computers and computer memory systems. More particularly, the present invention relates to a computer memory system utilizing a rotating, randomly accessible mass storage medium, such as a "hard", "fixed", "rigid" or Winchester disk drive, as a caching device.

As a general rule, central processors can process data significantly more quickly than it can be moved in and out of primary storage. Consequently, the performance of a computer system is substantially limited by the speed of its primary data storage devices and subsystems. In order to ameliorate this perceived "bottleneck", central processor interaction with primary storage may be minimized by storing frequently referenced data in a relatively small, high-speed semiconductor memory cache located between the processor and the primary storage devices. However, such semiconductor memory, whether dynamic or static random access memory ("DRAM" or "SRAM"), is relatively costly per megabyte of storage compared to disk drives (on the order of eighty times more expensive) and, as such, the cache must generally be of comparatively limited capacity. Small caches function relatively well for repeatedly small data burst loads but poorly for sustained loads.

When utilizing caching techniques, should a program issue a "read" command for an instruction or user data, the processor first looks in its cache memory. Should the requested data reside in the cache, (a cache "hit") there is no need to attempt to read from primary storage located on one or more disk drives or subsystems. However, if the requested data is not available in the cache, (a cache "miss") the processor must then access primary storage to retrieve the data sought.

Data which must be retrieved from primary storage may then be written to the semiconductor cache, where it may later be accessed by the processor. Alternatively, any data subsequently modified by the processor is also written to the cache. Inasmuch as the cache has relatively limited storage capacity, a data replacement algorithm is generally used to determine what existing data should be overwritten in the cache when additional data is read from primary storage.

In this regard, conventional semiconductor cache memory designs take advantage of a principle known as locality, with the two primary types of locality being referred to as temporal and spatial. The former category refers to locality in time, or the tendency of data and subroutines that have been used recently to be used again in the near future. As an example, loops in software programs tend to be executed many times, leading to reuse of the instructions in the loop. However, the amount of temporal locality of which a processor cache can take advantage is related to the size of the cache, its organization and its data replacement strategy.

Some semiconductor caches utilize an algorithm to "prefetch" data when a cache "miss" occurs. The process of prefetching cache data takes advantage of spatial locality, which refers to the tendency of computer programs to reference information that is located in proximity to recently accessed information. When a cache "miss" occurs, the cache prefetches data spatially related to the recently accessed information. Prefetching increases the probability that future cache hits will occur by anticipating the requirement for accesses to the data in the cache.

Regardless, due to its non-volatility and persistence as compared to semiconductor cache memory, primary storage must be kept up-to-date, or coherent, with any new data written to the cache by the processor to ensure its availability. In this regard, two fundamental techniques are used for coordinating writes to the cache with primary storage, namely "write-through" and "write-back" caching.

In a write-through semiconductor cache design, the processor writes the modified data to both the cache and the primary storage to ensure that both elements always have updated copies of the data. This is the simplest and most widely used method. On the other hand, a write-back cache keeps track of, and marks, data in the cache which has been modified by the processor. When such modified data is ultimately displaced from the cache, the data is then written to primary storage. Because data may be modified a number of times prior to being removed from the cache, writing data to primary storage only when it is displaced from the cache obviates the processor overhead of repeatedly updating primary storage with the same cached data each time it is modified by the processor.

In light of the foregoing, the current trend is toward ever larger semiconductor cache sizes. The larger the cache, the greater the anticipated "hit" rate. However, the trade-off with a larger semiconductor cache is the increased cost per megabyte of storage and, ultimately, the optimum cache size is determined by balancing cost against the performance requirements of the system. On the other hand, the input/output ("I/O") performance of a disk device is a function of various factors including rotational latencies and seek times and cannot equal that of faster semiconductor memories. Moreover, its overall system performance is also a function of the types of requests placed upon it and it generally performs best when sequentially accessing relatively large chunks of data. On the other hand, disk drive performance is generally less than optimal when it is directed to randomly access relatively small chunks of data with the difference in performance being on the order of five to 10 times worse. Empirically, the latter instance is the situation most often encountered in primary storage devices.

SUMMARY OF THE INVENTION

The computer memory system and method herein disclosed utilizes a rotating, randomly accessible mass storage medium, such as a "hard", "fixed", "rigid" or Winchester disk drive, as a caching device and is of especial utility in overcoming the cost, and hence size, limitations of conventional semiconductor cache memory. Although not as inherently fast as semiconductor memory caches, by substituting disk drive devices for semiconductor memory, the cache can maintain enhanced system performance for longer times under sustained loads. This performance enhancement is achieved by effectively decreasing the latency of the primary storage device through the use of a caching device, combining relatively small random requests into larger sequential requests, balancing the I/O load over several disk devices and/or canceling duplicate writes.

Unlike primary mass storage disk devices, the caching device is not constrained as to where to physically place the data. Hence, the use of a separate caching device allows the placement of data in a manner which is optimized with respect to the system's access patterns. Moreover, in addition to caching data from the primary storage device, historical records of accesses may also be maintained to enhance overall performance due to the increased cache size and its inherent non-volatility. Through the maintenance of access history, the caching device can enable prediction of future data accesses and retrieve, or prefetch, the appropriate system data prior to its request by a user.

Still further, the system herein disclosed allows a user to be able to "fine tune" the caching device's predictions by dividing the activity history into "epochs". Exemplary of such epochs might be "end-of-month-reports", "bi-weekly-paychecks" and the like wherein the caching device can utilize the history in the requested epoch when predicting future access patterns. The use of a relatively larger and less expensive caching device in lieu of semiconductor memory means that history may then be maintained in the caching device under user control or heuristics in order to enhance overall system I/O performance.

Specifically disclosed herein is a method for caching data in a computer system comprising the steps of: providing at least one primary computer mass storage device for maintaining data; further providing at least one rotating randomly accessible data caching device associated with the primary computer mass storage device for further maintaining at least a portion of the system data as cache data; reading at least a portion of the cache data from the caching device when the computer system requests access to selected data comprising a subset of the cache data; and alternatively reading at least some of the system data from the primary storage device when the computer system requests access to selected data not comprising a subset of the cache data.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 7 is a further representative logic flow chart of an exemplary "write" request when utilizing the caching device of the present invention; and FIG. 8 is a final representative logic flow chart of a cache manager for utilization in conjunction with the logic flow charts of FIGS. 6 and 7.

DESCRIPTION OF A PREFERRED EMBODIMENT

Figure 1:
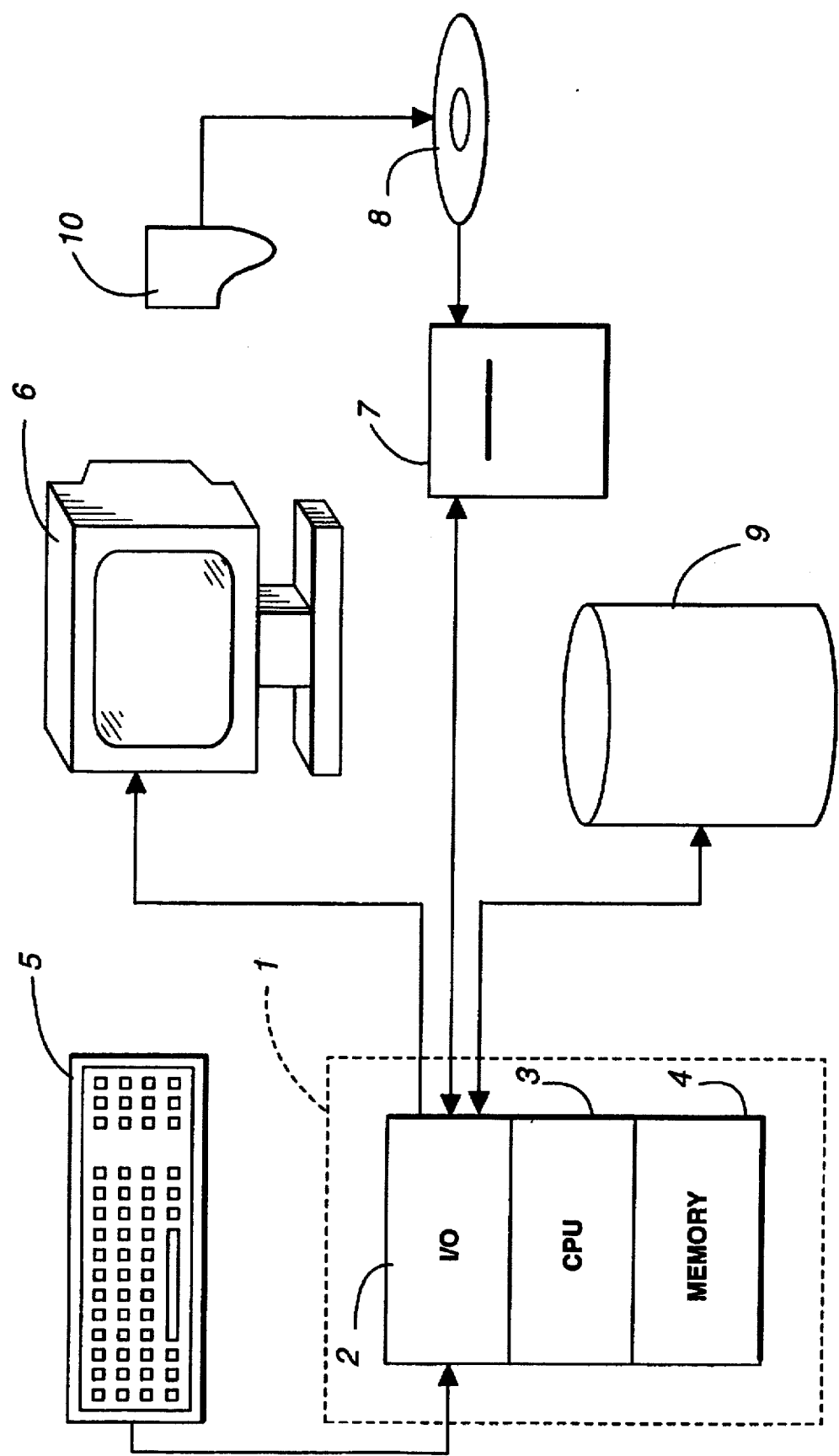
FIG. 1 is a simplified representational drawing of a general purpose computer forming a portion of the operating environment of the present invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 is connected to a keyboard 5, a display unit 6, a disk storage unit 9 and a compact disk read only memory ("CDROM") drive unit 7. The CDROM unit 7 can read a CDROM medium 8 which typically contains programs 10 and data. The computer program products containing mechanisms (i.e., computer readable program code devices) to effectuate the apparatus and methods of the present invention may reside in the memory section 4, or on a disk storage unit 9 or on the CDROM 8 of such a system.

Figure 2:
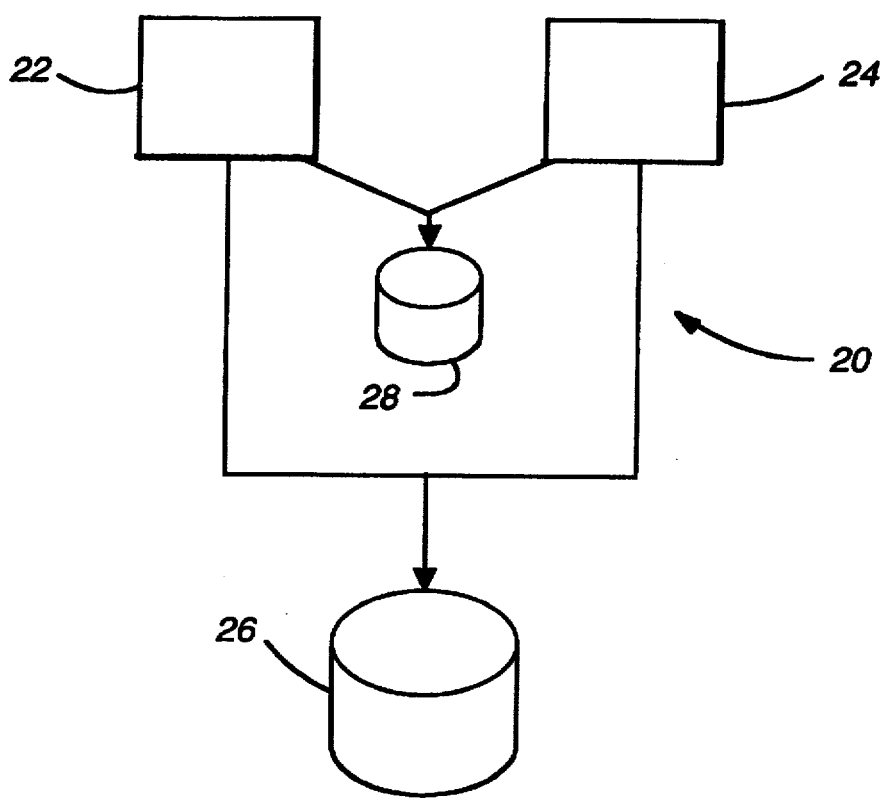
FIG. 2 is a simplified representation of a computer system including a pair of storage controllers coupled to a common primary storage device utilizing a rotating, randomly accessible mass storage medium as a caching device in accordance with one embodiment of the present invention.

With reference now to FIG. 2, a simplified representational view of a storage subsystem 20 is shown as one exemplary implementation of the caching device of the present invention. The storage subsystem 20 comprises, in pertinent part a pair of redundant storage controllers 22, 24 alternately couplable via separate buses to a primary storage device 26. Primary storage device 26 may comprise a conventional "hard", "fixed", "rigid" or Winchester disk drive to provide primary computer mass storage to the storage subsystem 20.

The controllers 22, 24 include data reader and data writer components that are coupled to a caching device 28 which comprises a rotating computer mass storage device to which data may be written and from which data may be read. The caching device 28 serves as a cache for data written to, or read from, the primary storage device (or devices) 26 much in the manner of conventional semiconductor memory cache. For example, a write request operation in accordance with the present invention is compatible with both "write-through" (i.e., substantially concurrently writing modified data to the caching device and the primary computer mass storage device) and "write-back" (i.e., consecutively writing modified data to the caching device and the primary computer mass storage device) strategies in the manner of conventional semiconductor memory cache described hereinbefore. Although performance of the storage subsystem 20 may not be enhanced to the extent provided by conventional semiconductor memory, the caching device can maintain enhanced performance for the storage subsystem 20 for a longer period under sustained I/O loads.

By caching "reads" and "writes" between the controllers 22, 24 and the primary storage device(s) 26, rotational and seek latencies of the storage subsystem 20 may be reduced and relatively small random I/O requests to the primary storage device 26 may be combined into relatively larger sequential requests to the caching device 28. In this manner, the caching device 28 can perform with far greater efficiency than the primary storage device 26, which will generally be randomly accessing only relatively small chunks of data in general operation as opposed to the five to ten times faster sequential access of larger data chunks in the caching device 28. Moreover, the location of cached data on the caching device 28 is not constrained as is the case with the primary storage device 26 and data placement may be optimized based upon historical data access patterns through the use of an appropriate cache manager function.

Still further, the use of the caching device 28 allows I/O history to be maintained in addition to cached data due to its increased size with respect to more costly conventional semiconductor cache memory and its non-volatility as compared to the most often utilized DRAMs. By retention of such historical data within the caching device 28, future data accesses may be more readily predicted such that the appropriate cache manager can write the most likely to be next accessed data to the caching device 28 in advance of an actual request. In this regard, the cache manager can "fine tune" the caching device 28 predictions by dividing the history into "epochs" such as "end-of-month-reports", "bi-weekly-paychecks" and other exemplary subdivisions to further aid in the prediction of data access patterns for particular operations of the storage subsystem 20.

Figure 3:
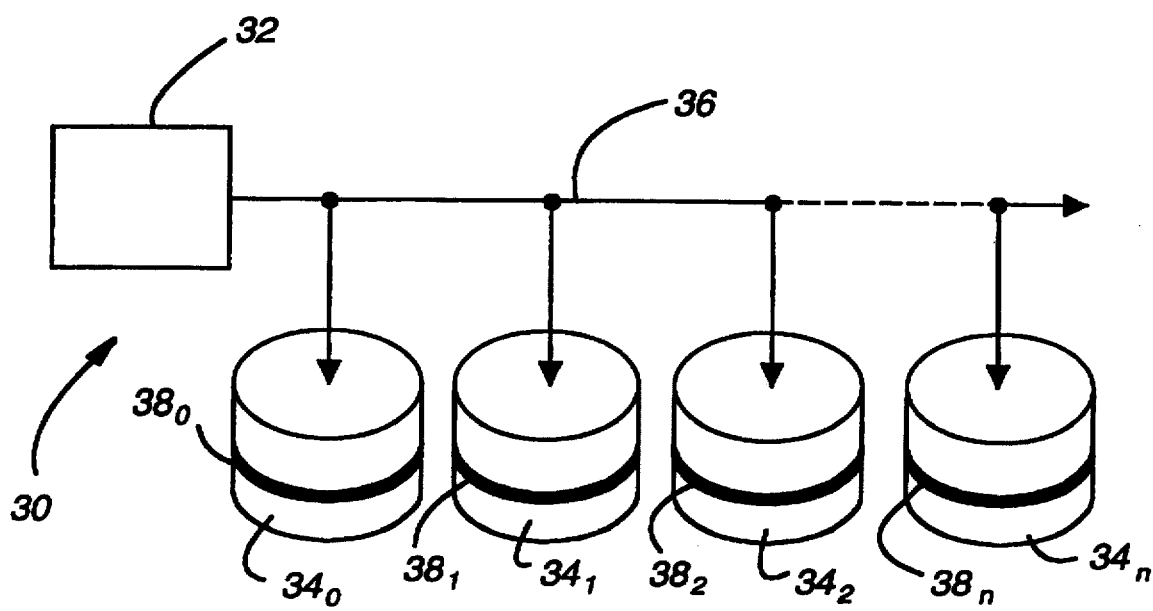
FIG. 3 is a further simplified representation of a storage controller coupled to a number of "daisy-chained" primary storage devices wherein a portion of each such device is partitioned as a caching device in accordance with another embodiment of the present invention.

With reference additionally now to FIG. 3, another exemplary configuration of a storage subsystem 30 in accordance with the present invention is shown. In this embodiment, a single controller 32 is operatively coupled to a number of separate primary storage devices $34_0$ through $34_n$, which are coupled in a daisy chain configuration to a common bus 36 such as the Small Computer System Interconnect ("SCSI"). In this representative embodiment of the present invention, instead of a separate caching device 28 (as shown and described with respect to FIG. 2) caching is effectuated by partitioning a portion of one or more of the primary storage devices $34_0$ through $34_n$ to function as caching device portions $38_0$ through 38. It should be noted that the caching need not be distributed among each of the primary storage devices $34_0$ through $34_n$ as illustrated and may be resident on only one or just a portion of the total number of disk drives in the storage subsystem 30.

Figure 4:
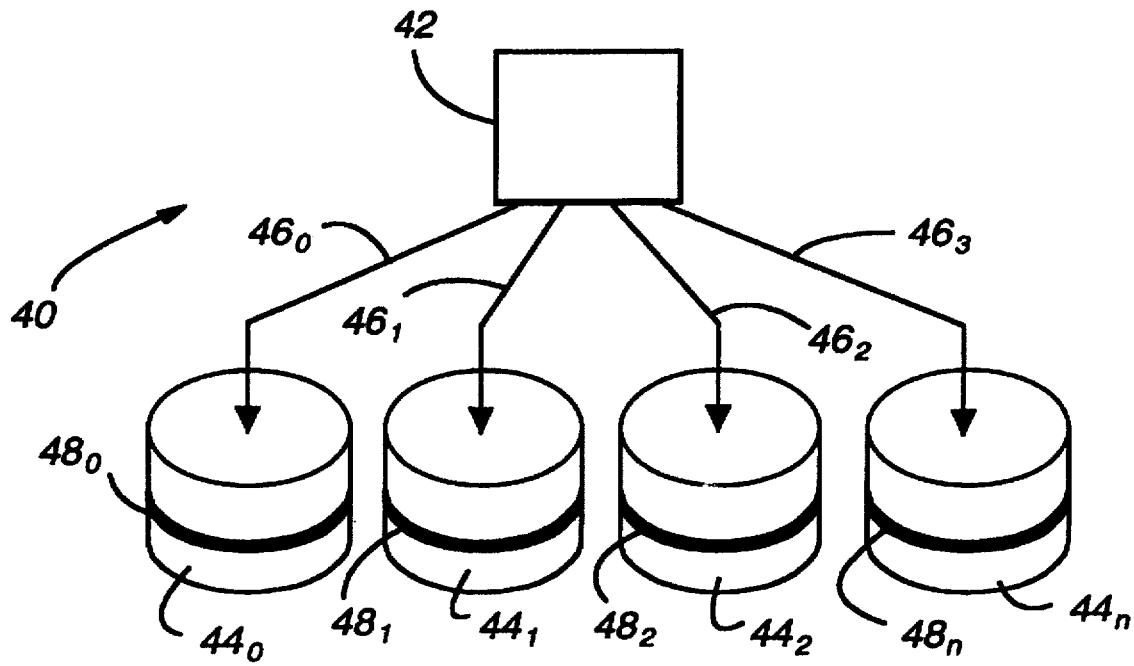
FIG. 4 is an additional simplified representation of a storage controller coupled in a differing configuration to a number of primary storage devices wherein, as in FIG. 3, a portion of each such device is partitioned as a caching device in accordance with still another embodiment of the present invention.

With reference additionally now to FIG. 4, a differing arrangement of an exemplary storage subsystem 40 is shown for possible utilization of the caching techniques described with respect to the preceding figures. In this embodiment, a single storage controller 42 is operatively coupled to a number of primary storage devices $44_0$ through $44_3$ by means of respective separate buses $46_0$ through $46_3$. As in the embodiment of FIG. 3, the caching may be effectuated in accordance with the present invention by means of partitioning a portion of one or more of the primary storage devices $44_0$ through $44_3$ to serve as caching device portions $48_0$ through $48_3$ as shown. Alternatively, the caching may be effectuated through the utilization of a separate caching device as shown and described with respect to the embodiment of FIG. 2.

Figure 5:
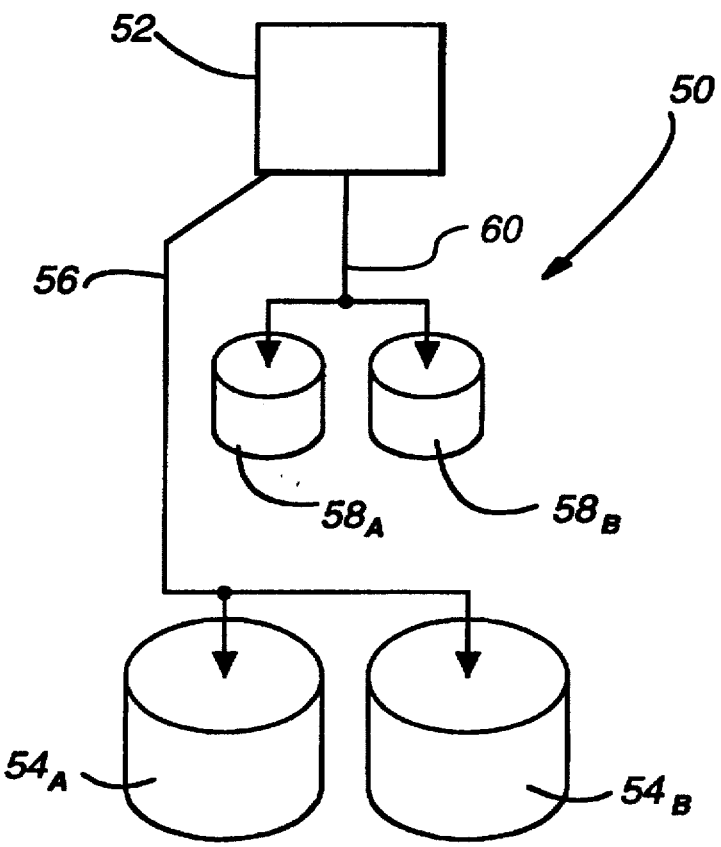
FIG. 5 is yet another simplified representation of a storage controller coupled to a pair of, for example, mirrored primary storage devices and wherein a separate pair of mirrored, rotating, randomly accessible mass storage media are utilized as a caching device in accordance with yet another embodiment of the present invention.

With reference additionally now to FIG. 5, yet another possible configuration for a storage subsystem 50 in accordance with the present invention is illustrated. In this embodiment, the storage subsystem 50 comprises a controller 52 operatively coupled to a mirrored pair of primary storage devices $54_A$ and $54_B$ from which data may be read and to which data may be written over a primary storage bus 56. A similar pair of mirrored caching devices $58_A$ and $58_B$ are also coupled to the controller 52 by means of a cache bus 60 to function as a caching device as previously described with respect to the exemplary embodiments of FIGS. 2-4. In this regard, the use of mirrored caching devices $58_A$ and $58_B$ provides enhanced availability for the cached data in the event of a single device failure. It should be noted however that the caching device configuration need not necessarily parallel that of the primary storage devices $54_A$ and $54_B$ and that any of the known redundant array of inexpensive disk ("RAID") levels inclusive of levels 0 through 6 may be utilized in conjunction with the caching device techniques illustrated and described with respect to the preceding figures.

Figure 6:
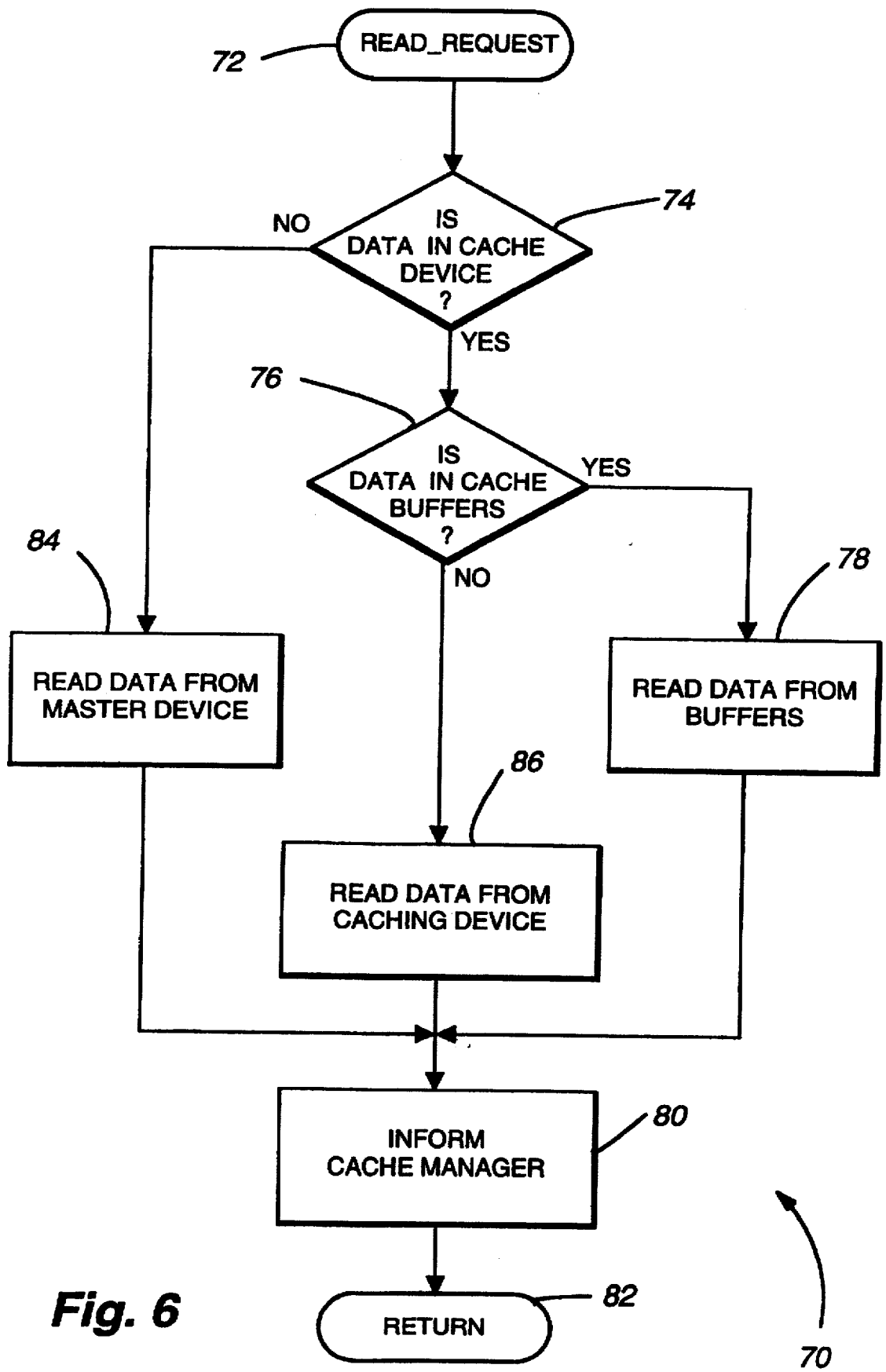
FIG. 6 is a representative logic flow chart of an exemplary "read" request when utilizing the caching device of the present invention.

With reference now to FIG. 6, a simplified logic flow chart for a "read" operation is shown as a read request process 70 to further illustrate the block of pseudocode following the description of FIG. 8. The process is initiated at step 72 to begin the Read$_{13}$Request subroutine. At decision step 74, if the data sought to be read is currently in the caching device, and at decision step 76 it is determined to reside in the caching device buffers, the data is read from the caching device buffers at step 78. The cache manager (described in more detail hereinafter with respect to FIG. 8) is informed of the read at step 80 to proceed to step 82 to return to initial step 72 as appropriate.

At decision step 74, if the data sought to be read is not in the caching device, the process 70 then proceeds to step 84 where the data is then read from the primary (or "Master") storage device, whereupon the cache manager is informed of the read from primary storage at step 80, followed by return step 82. Alternatively, if the data to be read is determined to be in the caching device at decision step 74 but it is not in the caching device buffers, the data is read from the caching device at step 86, the cache manager informed at step 80 and the process 70 re-initiated by return step 82.

With reference additionally now to FIG. 7, a logic flow chart for a write request operation in accordance with an exemplary implementation of the present invention is shown to more fully describe the pseudocode operation "Write$_{13}$Request" which follows. The write process 90 is initiated at step 92 and followed by an update of the caching device buffers at step 94. This is followed by a "flush" of other data from the caching device buffers if necessary at step 96 to accommodate the data written at step 94. At step 98 the cache manager is again informed of the operation and, at step 100, the process 90 returns to step 92 to await another write request.

With reference additionally now to FIG. 8, an exemplary logic flow chart for a cache manager ("Cache$_{13}$Manager") utilizable in conjunction with the preceding "read" and "write" request operations is shown in conjunction with the following pseudocode. The cache manager process 110 begins at step 112 and monitors read and write accesses to the caching device at step 114. At step 116, the cache history of previous I/O operations is also written to the caching device and the cache is prefilled from primary storage at step 118 in anticipation of requests for accesses to data in the caching device based upon the history also maintained within the caching device. At step 120 the cache manager process returns to step 112 to monitor the next access to the caching device.

The following pseudocode listing parallels the logic flow charts of FIGS. 6-8 to further describe exemplary "read", "write" and cache manager functions in implementing the principles of the present invention.

```
READ_REQUEST:
    If data resides on caching device
        If data resides in cache buffers
            Retrieve data from buffers
        Else
            Read data from caching device
    Else
        Read data from master device
    Inform CACHE_MANAGER
    Return
WRITE_REQUEST:
    Update cache buffers
    Flush buffers if necessary
    Inform CACHE_MANAGER
    Return
CACHE_MANAGER:
    Monitor cache accesses
    Update cache history
    Prefill cache when appropriate
    Return
```

While there have been described above the principles of the present invention in conjunction with specific exemplary implementations of a computer memory system utilizing a rotating, randomly accessible mass storage medium as a caching device, the foregoing description is made only by way of example and not as a limitation to the scope of the invention.

What is claimed is:

1. A method for caching data in a computer system comprising the steps of:

provideng at least one primary computer mass storage device for maintaining system data;

providing at least one rotating randomly accessible data caching device associated with said at least one primary computer mass storage device for maintaining at least a portion of said system data as cache data, wherein said caching device has substantially similar I/O performance as said primary computer mass storage device;

providing for reading at least a portion of said cache data from said caching device when said computer system requests access to selected data comprising a subset of said cache data;

providing for alternatively reading at least some of said system data from said primary computer mass storage device when said computer system requests access to said selected data not comprising a subset of said cache data; and providing for writing said at least some of said system data to said caching device from said primary computer mass storage device.

2. The method of claim 1 further comprising the step of:

providing for modifying at least some portion of said system data to produce modified data;

providing for firstly writing said modified data to said caching device to provide cached modified data; and providing for secondly writing said modified data to said primary computer mass storage device to provide system modified data.

3. The method of claim 2 wherein said steps of providing for firstly and secondly writing are carried out substantially concurrently.

4. The method of claim 2 wherein said steps of providing for firstly and secondly writing are carried out substantially consecutively.

5. The method of claim 1 further comprising the step of:

providing for also writing historical data in a non-volatile manner to said caching device representative of groups of said at least some of said system data previously accessed from said primary computer mass storage device.

6. The method of claim 5 further comprising the steps of:

providing for monitoring said system data previously accessed from said primary computer mass storage device;

providing for prefetching selected data from said primary computer mass storage device wherein the prefeched data is selected based upon said historical data; and providing for storing said prefeched data in said caching device.

7. The method of claim 1 wherein said steps of providing at least one primary computer mass storage device and further providing at least one rotating randomly accessible data caching device are carried out by respective disk drive devices.

8. The method of claim 1 wherein said step of further providing at least one rotating randomly accessible data caching device is carried out by the step of:

providing for partitioning a portion of a disk drive comprising said primary computer mass storage device as said caching device.

9. A computer program product embodied on: a computer usable medium having computer readable code embodied therein for causing caching of data in a computer system having at least one primary computer mass storage device for maintaining system data and at least one rotating randomly accessible data caching device associated with said at least one primary computer mass storage device for further maintaining at least a portion of said system data as cache data, wherein said caching device has substantially similar I/O performance as said primary computer mass storage device, the computer program product comprising:

computer readable program code devices configured to cause a computer to effect reading at least a portion of said cache data from said caching device when said computer system requests access to selected data comprising a subset of said cache data;

computer readable program code devices configured to cause a computer to effect alternatively reading at least some of said system data from said primary computer mass storage device when said computer system requests access to said selected data not comprising a subset of said cache data; and computer readable program code devices configured to cause a computer to effect writing said at least some of said system data to said caching device from said primary computer mass storage device.

10. The computer program product of claim 9 further comprising:

computer readable program code devices configured to cause a computer to effect modifying at least some portion of said system data to produce modified data;

computer readable program code devices configured to cause a computer to effect firstly writing said modified data to said caching device to provide cached modified data; and computer readable program code devices configured to cause a computer to effect secondly writing said modified data to said primary computer mass storage device to provide system modified data.

11. The computer program product of claim 10 wherein said computer readable program code devices configured to cause a computer to effect firstly and secondly writing are executed substantially concurrently.

12. The computer program product of claim 10 wherein said computer readable program code devices configured to cause a computer to effect firstly and secondly writing are executed substantially consecutively.

13. The computer program product of claim 9 further comprising:

computer readable program code devices configured to cause a computer to effect writing historical data in a non-volatile manner to said caching device representative of groups of said at least some of said system data previously accessed from said primary computer mass storage device.

14. The computer program product of claim 13 further comprising:

computer readable program code devices configured to cause a computer to effect monitoring said system data previously accessed from said primary computer mass storage device;

computer readable program code devices configured to cause a computer to effect prefetching selected data from said primary computer mass storage device wherein the prefeched data is selected based upon said historical data; and computer readable program code devices configured to cause a computer to effect storing said related data in said caching device.

15. The computer program product of claim 9 wherein said at least one primary computer mass storage device and said at least one rotating randomly accessible data caching device comprise separate disk drives.

16. The computer program product of claim 9 wherein said at least one rotating randomly accessible data caching device comprises a partitioned portion of said at least one primary computer mass storage device.

17. A computer system comprising:

a storage controller;

a primary computer mass storage device for maintaining system data, said primary mass storage device comprising a disk drive, wherein said system data is organized so as to require relatively small random I/O requests;

at least one caching device associated with said at least one primary computer mass storage device for maintaining at least a portion of said system data as cache data, said caching device comprising a disk drive wherein said portion of said system data is organized to support relatively larger sequential requests.

18. The computer system of claim 17 further comprising:

a data reader for reading at least a portion of said cache data from said caching device when said computer system requests access to selected data comprising a subset of said cache data and alternatively reading at least some of said system data from said primary computer mass storage device when said computer system requests access to said selected data not comprising a subset of said cache data; and a data writer for writing said at least some of said system data to said caching device from said primary computer mass storage device.

19. The computer system of claim 18 wherein said data writer is operable to further modify at least some portion of said system data to produce modified data, firstly write said modified data to said caching device to provide cached modified data and secondly write said modified data to said primary computer mass storage device to provide system modified data.

20. The computer system of claim 19 wherein said data writer executes said write of said modified data to said caching device and to said primary computer mass storage device substantially concurrently.

21. The computer system of claim 19 wherein said data writer executes said write of said modified data to said caching device and to said primary computer mass storage device substantially consecutively.

22. The computer system of claim 18 further comprising:

a cache manager operative in association with said data reader and said data writer to cause historical data to be written in a non-volatile manner to said caching device representative of groups of said at least some of said system data previously accessed from said primary computer mass storage device.

23. The computer system of claim 22 wherein said cache manager is operative to monitor said system data previously accessed from said primary computer mass storage device, cause a prefetch of selected data from said primary computer mass storage device wherein the prefeched data is selected based upon said historical data and cause said related data to be stored in said caching device.

24. The computer system of claim 17 wherein said at least one primary computer mass storage device and said at least one rotating randomly accessible data caching device comprise separate disk drives.

25. The computer system of claim 17 wherein said at least one rotating randomly accessible data caching device comprises a partitioned portion of said at least one primary computer mass storage device.

* * * * *